(12) United States Patent
Steinebrunner et al.

(10) Patent No.: US 8,182,262 B2
(45) Date of Patent: May 22, 2012

(54) STACK INJECTION MOLDING MACHINE

(75) Inventors: Timo Steinebrunner, Riegel (DE); Markus Matt, Teningen (DE)

(73) Assignee: Zahoransky Formenbau GmbH, Freiburg (DE)

( * ) Notice: Subject to any disclaimer, the term of this patent is extended or adjusted under 35 U.S.C. 154(b) by 77 days.

(21) Appl. No.: 12/793,004

(22) Filed: Jun. 3, 2010

(65) Prior Publication Data

US 2010/0310697 A1 Dec. 9, 2010

(30) Foreign Application Priority Data

Jun. 3, 2009 (DE) .......................... 10 2009 023 719

(51) Int. Cl.
*B29C 45/10* (2006.01)

(52) U.S. Cl. ........ 425/572; 264/255; 425/574; 425/576; 425/588

(58) Field of Classification Search .................. 425/572, 425/574, 575, 576, 588; 264/255
See application file for complete search history.

(56) References Cited

U.S. PATENT DOCUMENTS

| | | | | |
|---|---|---|---|---|
| 4,734,023 A * | 3/1988 | Nesch et al. | .................. | 425/572 |
| 4,836,767 A * | 6/1989 | Schad et al. | .................. | 425/576 |
| 7,081,222 B2 | 7/2006 | Gram | | |
| 8,025,828 B2 * | 9/2011 | Armbruster | .................. | 264/255 |

FOREIGN PATENT DOCUMENTS

| | | |
|---|---|---|
| DE | 10121691 | 11/2002 |
| DE | 102006024481 | 11/2007 |
| EP | 1892074 | 2/2008 |
| WO | 2004103676 | 12/2004 |
| WO | 2005077637 | 8/2005 |

* cited by examiner

*Primary Examiner* — Timothy Heitbrink
(74) *Attorney, Agent, or Firm* — Volpe and Koenig, P.C.

(57) ABSTRACT

An injection molding machine (1) having a stack mold (2) for producing injection molded parts comprises a fixed exterior molding part (3), a central block (5), as well as a mobile exterior molding part (4), with molding cavities being formed between the molding areas (9a, 9b) at the interior sides of the exterior molding parts (3, 4) and molding areas (10a, 10b) at opposite exterior sides of the central block (5). The central block (5) is supported rotationally or pivotally and at two exterior surfaces, adjacent to each other in the rotational or pivotal direction, molding areas (10a) are provided for first partial pre-molds (8a, 8c, 8e) and at the two other exterior surfaces, adjacent to each other, molding areas (10b) for second partial pre-molds (8b, 8d). The two exterior molding parts (3, 4) each include molding areas (9a, 9b) for one of the two partial pre-molds (8a, 8b, 8c, 8d, 8e) and, off-set in the rotary or pivotal direction in reference to the exterior molding parts (3, 4), at least one gripper (11a, 11b) each is provided for removing and holding a partial pre-mold (8a, 8c, 8e) and for positioning a previously removed first partial pre-mold (8a, 8c, 8e) to be interconnected to a second partial pre-mold (8b, 8d.) Alternatively the grippers for removing and holding a partial pre-mold (8f, 8g, 8h, 8i, 8l) and for inserting a previously removed first partial pre-mold (8f, 8g, 8h, 8i, 8l) is provided in a molding area (10b1, 10b2) for second partial pre-molds (8j, 8k) of the central block (5.)

7 Claims, 7 Drawing Sheets

STACK INJECTION MOLDING MACHINE

CROSS-REFERENCE TO RELATED APPLICATIONS

This application claims the benefit of German Patent Application No. 10 2009 023 719.4-16, filed Jun. 3, 2009, which is incorporated herein by reference as if fully set forth.

BACKGROUND

The invention relates to an injection molding machine with a stack mold for producing injection-molded parts, comprising a fixed exterior molding part, a central block supported in a rotational or swiveled fashion, as well as a movable exterior molding part, with molding cavities being formed between the molding areas at the interior sides of the exterior molding parts and the molding areas at opposite exterior sides of the central block.

Such stack molds are known in numerous embodiments, in order for example to produce twice the number of injection-molded parts on a single injection molding machine. In a further development of these stack molds, the central block is pivotal such that a two-component injection-molded part can be produced on a single injection molding machine, by first injection-molding a pre-mold in one level, then the central block or a part thereof being rotated with the pre-mold into a different level, and there the injection-molding process being finished. Such alternating tools are known, for example from DE 101 21 691 A1. Additionally, injection molding machines are known having a dual alternating tool, for example from WO 2005/077637 A1 or U.S. Pat. No. 7,081,222 B2, in which two partial pre-molds are produced on two central blocks arranged side-by-side, which then, after the rotation of the central blocks, are made to face each other and are interconnected by the closing motion of the stack mold.

In these injection molding machines of prior art it is problematic, however, that they are expensive in their construction due to the two rotary drives for the two central blocks and the necessary media guides as well as the devices for a linear displacement of the two central blocks in reference to each other. Additionally, such an injection molding devices is of great construction height and, in its open state, the turning circles of both central blocks have to be considered. Furthermore, such injection molding devices are only suitable for injection-molded parts that shall be interconnected positioned inside the molding cavities, for example for hemispheres being partial pre-molds, which shall be assembled to form a closed sphere.

A device having two external platens and a central rotary mold carrier element is known from DE 10 2006 024 481 A1, each comprising molding halves, which in a closed state form molding cavities for different molded parts. At the exterior platens, one displacement table is respectively provided having at least two molding halves each. By a longitudinal displacement, one of the molding halves of a displacement table can each be brought into the corresponding area of the molding half of the central mold carrier element. This way, two molded parts can be injection-molded simultaneously, while the respectively free molding halves of the displacement tables are being cleaned or coated with mold release agents. This way a rapid processing speed can be achieved. The production of multi-component injection molded parts is not provided in the device according to DE 10 2006 024 481 A1, though.

WO 2004/103676 A2 shows and describes a method and a device in which a rotary molding half is arranged between two exterior molding halves. The first exterior molding half as well as the rotary molding half each comprise molding cavities for two parts. In a first processing step, in the area of the first molding half, first and second injection-molded parts are formed, which after the rotation of the rotary molded half are connected to each other by one of the injection-molded parts being removed and being attached to the injection-molded part remaining at the rotary molded part. After another rotation of the rotary molding part, injection gating is attached to the injection-molded part assembled in that manner. For this purpose, the second exterior molding part comprises an appropriate molding cavity.

Using such a device injection-molded parts can be produced comprising three components. However, the device is very complicated and thus expensive, because at the lateral surfaces molding cavities are provided each for the first and the second injection-molded part.

SUMMARY

Therefore, the object is to provide an injection molding machine of the type mentioned at the outset, which is of a low construction height, easily constructed, and by which partial pre-molds can be connected to each other even in a position-corrected fashion or by which the first partial pre-mold can be provided with an injection gating representing the second partial pre-mold.

This object is attained according to the invention in that at two exterior surfaces adjacent to each other in the rotary or pivotal direction, the central block comprises molding areas for first partial pre-molds, and at the other two exterior surfaces, adjacent to each other, molding areas for second partial pre-molds, the two external molding parts each comprise molding areas for one of the two partial pre-molds, and in the rotary or pivotal direction, off-set in reference to the exterior molding parts, at least one gripper each is provided for removing and holding a partial pre-mold and for positioning a previously removed first partial pre-mold at a second partial pre-mold in order to be connected thereto or to remove or hold a partial pre-mold and to insert a previously removed first partial pre-mold into a molding area for second partial pre-molds of the central block.

At the two exterior molding parts, in the locked position, different partial pre-molds are produced; at one exterior molding part always the first partial pre-mold and at the other exterior molding part always a second partial pre-mold.

According to a first variation, at the beginning of the production process, injection molding occurs for the first partial pre-mold only at the exterior molding part, a second partial pre-mold is not yet injection molded. After the molds are opened, the central block is rotated by 90° and the molds are closed again so that the molding areas previously located at the outside of the central block now form, together with the molding areas of the exterior molding parts, the molding cavities, in which then additional partial pre-molds are produced after the first injection cycle, in which, as described above, only in one of the exterior molding parts injection molding occurs, at both of the exterior molding parts a first or a second partial pre-mold is injection molded.

The molding areas can represent cavities, in particular, or a cavity, for example at the exterior molding part, is complemented to form a molding cavity by a molding protrusion projecting into said cavity in the closed position, creating the molding area of the central block.

The previously injection molded first partial pre-mold is arranged in the area of the gripper during the second injection molding process and is removed therefrom and held. After the second injection molding process the stack mold is opened and the central block is pivoted by 90° in the opposite direction in reference to the previous pivoting process. This way, the just injection-molded second partial pre-mold is located in the area of the previously injection molded first partial pre-mold, held by the gripper. By an appropriate positioning motion of the gripper the first partial pre-mold can approach the second partial pre-mold and be connected with it. Depending on the type and embodiment of the partial pre-mold the connection can, for example, occur by a snapping connection and an appropriate linear positioning motion of the gripper or by a bayonet lock and a rotary motion of the gripper. Here, it is also possible to correct the first partial pre-mold in its position or alignment, for example to rotate it by 180° prior to its connection such that the side of the partial pre-mold previously facing away from the central block then faces the central block and the second partial pre-mold. For this purpose, the gripper can be held for example by a robotic arm allowing a universal motion. After the connection, the finished injection molded part is ejected from the molding area of the central block.

The first partial pre-mold, injection molded during the second injection molding cycle, is located at the opposite side of the central block and can be removed from its molding area of the central block and held by another gripper.

In another processing, always alternating, on the one side a first partial pre-mold is removed with one of the grippers from the central block and connected to another partial pre-mold previously removed from the opposite side, while in the closed mold at the exterior molding parts additional partial pre-molds are injection molded. The rotary or pivotal motion of the central block between the injection molding processes occurs in an oscillating fashion by 90° each alternating in one or the other direction.

This way, the injection molding machine according to the invention allows production of a molded part assembled from two partial pre-molds, with the alignment of the two partial pre-molds in the connecting position towards each other not being limited to their alignment inside the respective molding area during the injection molding process. Additionally, the injection molding machine is easily designed and can be realized with a low construction height. At the central block only a total of four molding areas are required, two for each partial pre-mold, compared to at least six molding areas in injection molding machines of prior art having two rotary central blocks, which further simplifies the production and reduces the production costs for the injection molding machine.

According to a second variation, at the beginning of the production process, again injection molding occurs only at the exterior molding part for the first partial molded part forming a pre-mold. After opening the mold, the central block is also pivoted by 90° and the mold is closed again so that the molding areas of the central block previously located at the outside now together with the molding areas of the exterior molding parts form molding cavities, in which then additional partial pre-molds are produced. Contrary to the above-described first variant now again only a first partial pre-mold is injection molded.

During the second injection molding process the previously injection molded first partial pre-mold is arranged in the area of the gripper and is removed thereby and held. After the second injection molding process the stack mold is opened and the central block is pivoted by 90° in the opposite direction in reference to the previous rotation process. This way, the first partial pre-mold; injection molded during the first cycle and held by the gripper, is located in front of a molding area for the second partial pre-mold. In this variant the part is embodied to accept a first partial pre-mold, which after another pivotal motion of the central block is arranged in the area of the exterior molding part for a second partial injection molded part. In the closed mold, then the second partial pre-mold is injection molded at the first partial pre-mold, which is located in the molding cavity formed by the molding areas of the respective exterior molding part and the central block, thus forming a two-part finished molded part without any additional assembly.

This finished molded part can be removed after the mold has been opened and ejected after another pivotal motion of the central block or removed from the molding area of the central block with the gripper.

The first partial pre-mold, injection-molded after the first pivoting of the central block, is located at the previous injection-molded first partial pre-mold at the side of the central block opposite the first gripper during the injection-molding of the second partial pre-mold and can be removed from its molding area of the central block and held by another gripper.

During further processing, always alternating on one side a first partial pre-mold is removed from the central block by the gripper and on the opposite side a finished injection molded part, comprising a first partial pre-mold and an second partial pre-mold injection-molded thereto, while in the closed mold, at the exterior molding parts additional first pre-molds are being injection-molded and at the opposite exterior molding part are externally injection-molded to the second partial pre-mold. The rotary or pivotal motion of the central block between the injection molding processes occurs here once more in an oscillating fashion by 90° each alternating in one or the other direction.

This way it is possible in a quick and simple fashion to produce injection molded parts from two partial pre-molds formed by an injection-molding process at or around a first partial pre-mold. In particular, two-colored injection molded parts or injection molded parts comprising two different materials can be produced.

In the processing cycle, in which a first partial pre-mold is held in a gripper, this partial pre-mold can still be processed, for example cooled or impinged with ionized air. It is also possible to mount another part at said pre-mold, which then during the additional injection-molding process of the second pre-mold can be partially enclosed by said pre-mold and thus being fixed.

Depending on the type of partial pre-molds, they may be connected to each other in a mechanical fashion, as described in the first variant, for example by latching or by a bayonet lock and a rotary motion. For this purpose, the grippers can be appropriately articulate, for example via a robotic arm.

If no other connection technology is required or desired, a connection device may be provided for connecting the partial pre-molds to each other.

The adhesive connection may be embodied, for example, by inserting an adhesive material into the connection area between the two partial pre-molds to be interconnected.

Alternatively, the connection device for welding the partial pre-molds to each other may be embodied. For example, the partial pre-molds can be connected to each other by way of hot-plate welding.

Another embodiment of the invention provides that the feeding device is provided to supply a supplementary element to connect the two pre-molds to each other via the supplementary element to be connected to or held at the partial pre-molds.

For example, the first partial pre-mold may represent the plate of a pacifier and the second partial pre-mold the corresponding cover, for example comprising the eye for a fastening string, between which the pacifier mouth piece made from latex or rubber is inserted as an additional element and is fastened thereat by this connection.

In order to allow several pre-molds to be produced simultaneously it is advantageous when at each of the exterior surfaces of the central block several molding areas, arranged side-by-side in the perpendicular direction in reference to the rotational central axis, are provided for one of the two partial pre-molds as well as corresponding molding areas arranged side-by-side at both exterior molding parts. This way, simultaneously several partial pre-molds can be produced and/or connected to each other to form a molded part such that the production output of the injection molding machine is increased. Here, one gripper each is provided to remove and hold the partial pre-molds arranged side-by-side.

Furthermore, several processing levels may be provided, arranged successively in the direction of the rotary axis of the central block. The above-described production steps can therefore be performed parallel and simultaneously at the individual processing levels and the production output of the injection molding machine can further be increased.

By the combination of the molding areas arranged side-by-side perpendicularly in reference to the rotary axis and the processing levels arranged successively in reference to the direction of the rotary axis the production of the partial pre-molds is possible in a matrix arrangement, for example 2×2, i.e. two molding areas next to each other and two thereabove, or 4×8, etc. This way a high production output of the injection molding machine is possible.

Additionally, testing devices for the injection-molded parts assembled from two partial pre-molds each may be provided. For example, optic tests but also physical tests, for example flow-through tests of bores or recesses may be performed. These tests can be performed prior to the ejection of the pre-mold, still held with the second partial pre-mold at the central block. Here, the injection molded part is held in a predefined position, which facilitates the execution of the test. Another picking-up and alignment of the injection molded part, which would be necessary after the ejection from the central block, is therefore unnecessary, and the execution of the test can be performed in a quick and simple fashion.

The drive for the central block as well as the opening and closing motion of the mold via the central block and the mobile exterior molding part can occur via proven drive systems, particularly electric engines, hydraulic drives, rack-and-pinion drives, etc.

BRIEF DESCRIPTION OF THE DRAWINGS

In the following, exemplary embodiments of the injection molding machine are explained in greater detail using the drawings.

Shown in schematic illustration are.

DETAILED DESCRIPTION OF THE PREFERRED EMBODIMENTS

Figure 1:
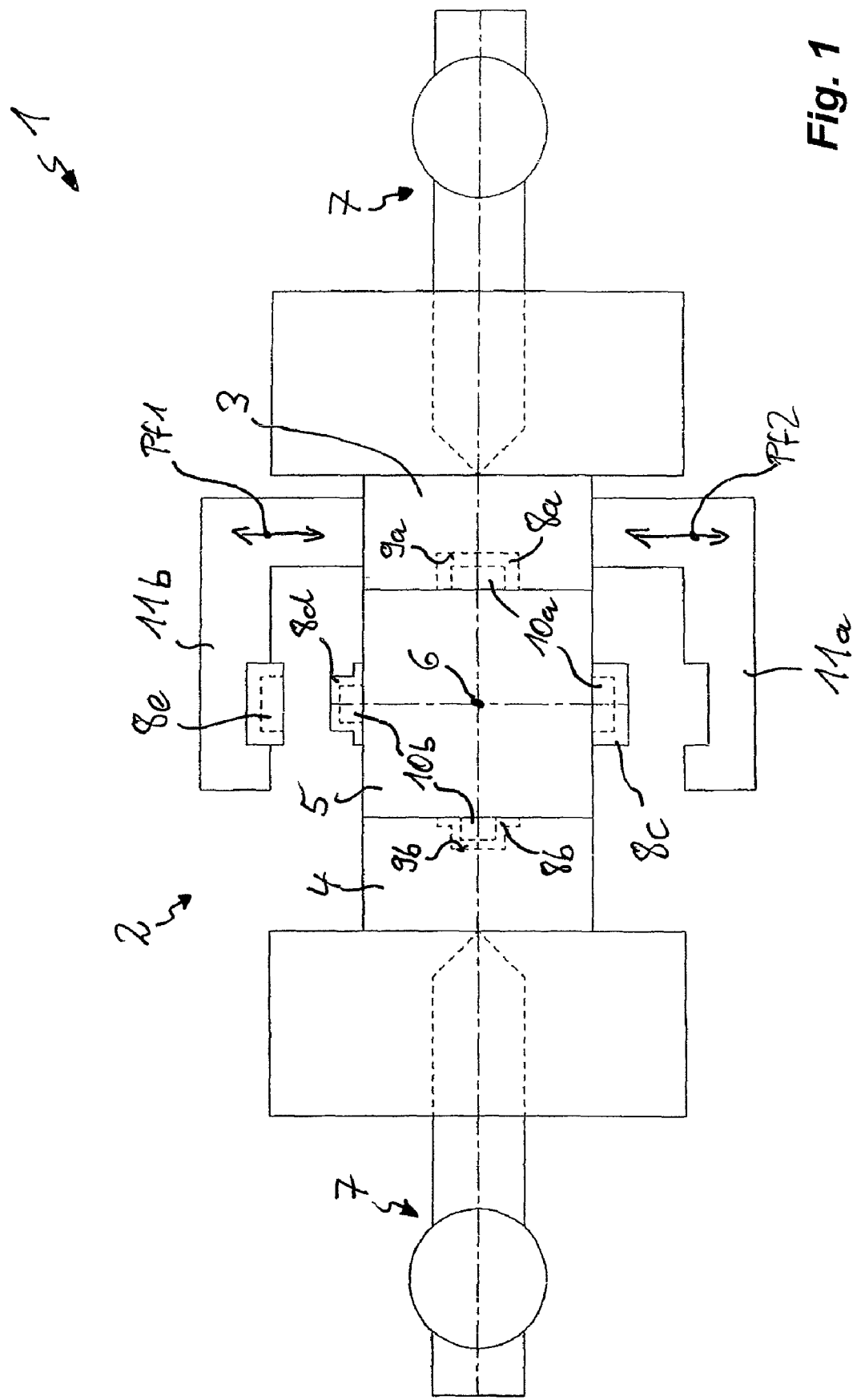
FIG. 1 through FIG. 3 are top views of an injection molding machine in various operational states.

According to FIGS. 1 through 4, an injection molding machine, in its entirety marked 1, comprises a stack mold 2 for producing injection molded parts. Here, a fixed exterior molding part 3, a central block 5, as well as a mobile exterior molding part 4 are provided. The central block 5 and the mobile exterior molding part 4 are linearly displaceable between a closed position, shown in FIGS. 1, 3, 4, and an open position, shown in FIG. 2. In the open position the central block 5 can be pivoted around a rotary axis 6, with an oscillating pivoting by 90° each being provided in one direction and in the subsequent processing cycle in the opposite direction.

The exterior molding parts 3, 4 are each allocated to an injection molding device 7 having feeds, not shown in greater detail, for the injection molding material to produce partial pre-molds 8a, 8b, 8c, 8d, 8e. The fixed exterior molding part 3 comprises a cavity as a molding area 9a for a first partial pre-mold and the mobile exterior molding part 4 comprises a cavity as the molding area 9b for a second partial pre-mold. At the central block 5, at two adjacent exterior surfaces each, seen in the pivotal direction, molding areas 10a are provided for a first partial pre-mold, and molding areas 10b for a second partial pre-mold, which in the closed position form a molding cavity together with the cavity of a molding area 9a, 9b of the exterior molding parts 3, 4.

In the area of the exterior free sides of the central block 5, arranged off-set in the rotational direction of the central axis 5 in reference to the exterior molding parts 3, 4, one gripper 11a, 11b each is provided, by which a first partial pre-mold can be removed from the central block 5 and be held.

In the situation shown in FIG. 1 a first partial pre-mold 8a is injection molded at the fixed exterior molding part 3 and a second partial pre-mold 8b at the mobile exterior molding part 4. A first partial pre-mold 8c, injection molded in a previous processing cycle, is now located, after a rotation of the central block 5 by 90° in the clockwise direction, in the area of the lower gripper 11a in FIG. 1 and can be removed by it and held (arrow Pf2.) The second partial pre-mold 8d, injection molded in the previous processing cycle at the mobile exterior molding part 4, is now located in the area of the upper gripper 11b in FIG. 1. This gripper 11b holds the first partial pre-mold 8e, injection molded two cycles earlier and removed from the central block 5 in the previous processing cycle. Via the gripper 11b this first partial pre-mold 8e can approach (arrow Pf1) the second partial pre-mold 8d and connected thereto, for example mechanically by latching or with the help of a connection device, not shown, for welding or adhering. The finished injection molded part, assembled from the two partial pre-molds 8d, 8e can then be ejected from the central block 5.

After these processing steps, the mobile exterior molding part 4 and the central block 5 can be moved into their opening position (FIG. 2) and the central block 5 is rotated or pivoted by 90° in the counter-clockwise direction (arrow Pf3.) This way, the previously injection-molded first partial pre-mold 8a reaches the area of the upper gripper 11b (FIG. 3) and can be removed by the gripper 11b, after or perhaps already during the adjustment of the central block 5 and the mobile exterior molding part 4 into their closed position.

Then, the second partial pre-mold 8d is located in the area of the lower gripper 11a, which still holds the previously removed first partial pre-mold 8c. These two partial pre-molds 8b, 8c can now be interconnected with the help of the gripper 11a (arrow Pf2) and the finished injection molded part can then be ejected.

In the meantime another first and second partial pre-mold can be injection molded at the two exterior molding parts 3, 4.

Subsequently to the processing shown in FIG. 3, in the opening position the central block 5 is again pivoted by 90° in the clockwise direction, i.e. against the previous pivotal direction, so that again a situation results according to FIG. 1. These processing cycles are performed continuously.

Due to the pivoting of the central block 5 by 90° each in one or the other direction, i.e. the oscillating motion of the central block 5, alternating a first partial pre-mold is removed and held at one of the two grippers 11*a*, 11*b* or a previously removed first partial pre-mold is connected to a second partial pre-mold provided at the central block 5. In the meantime, one new partial pre-mold each is injection molded at the other sides of the central block 5 and the two exterior molding parts 3, 4.

This way, a processing step is ongoing at all times and at all four sides of the central block 5, which results in very high productivity and rapid processing.

Using a feeding device, not shown, an additional element can be supplied to the partial pre-molds, mounted thereto for connecting the partial pre-molds or held at or in it. This way, even the production of complex objects is possible.

Figure 4:
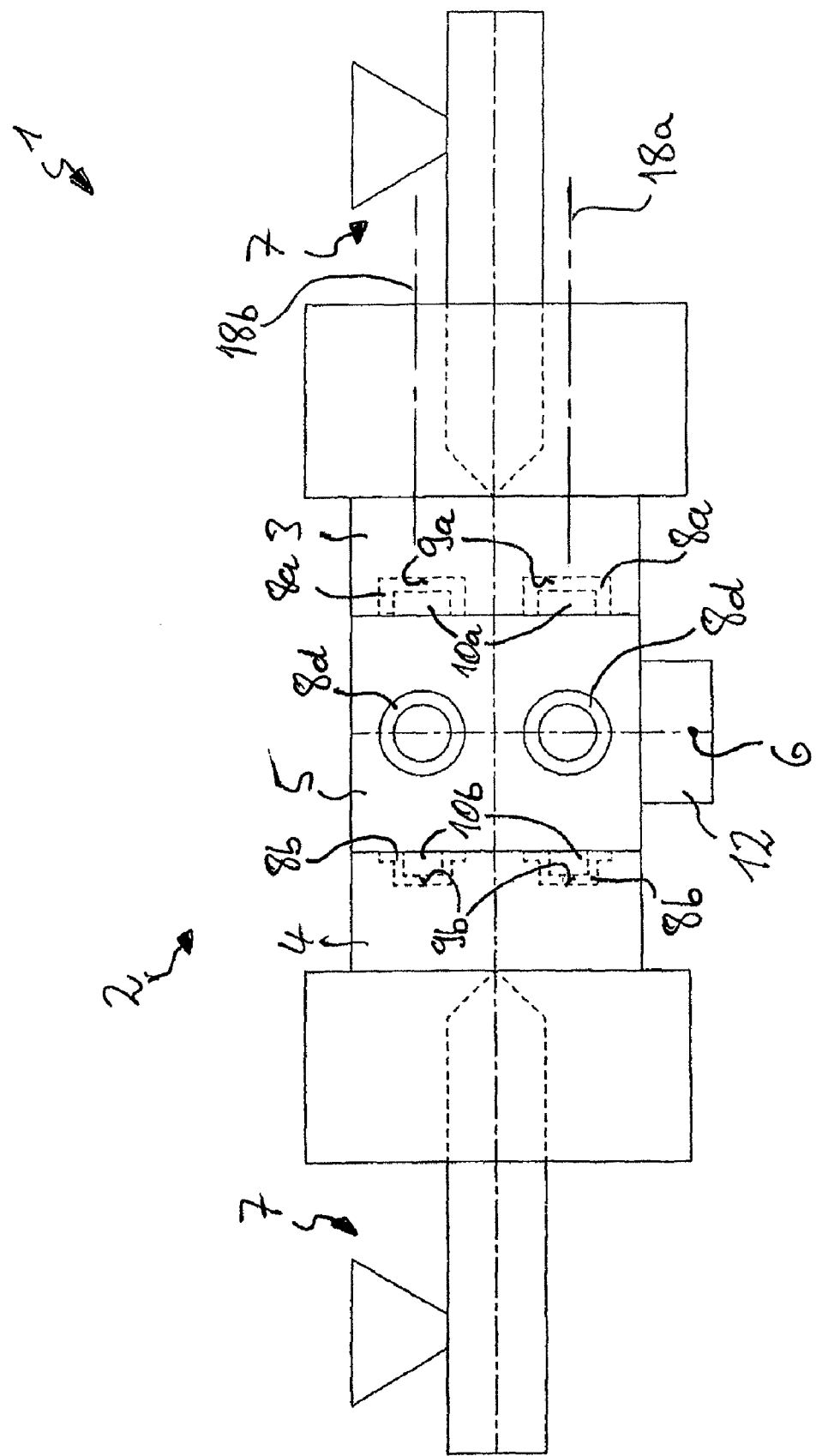
FIG. 4 is a side view of the injection molding machine of FIG. 1.

FIG. 4 shows a side view of the injection molding machine, rotated by 90° in reference to FIG. 1, with the grippers not being shown for reasons of clarity. In FIG. 4 it is discernible that several processing levels 18*a*, 18*b* are provided, arranged successively in the direction of the rotary axis 6 of the central block 5. Accordingly, the central block 5 comprises at each of its four sides several molding areas 10*a*, 10*b* arranged side-by-side in the direction of its rotary axis 6. Accordingly, the exterior molding parts 3, 4 are provided with several molding areas 9*a*, 9*b*. Thus, during one processing cycle', several partial pre-molds can be injection molded and assembled, which increases the processing speed. The increased constructive expense is only little, though, in particular only one rotary drive 12 is required for the central block 5; the same applies to the linear drives for the mobile exterior molding part 4.

Figure 5:
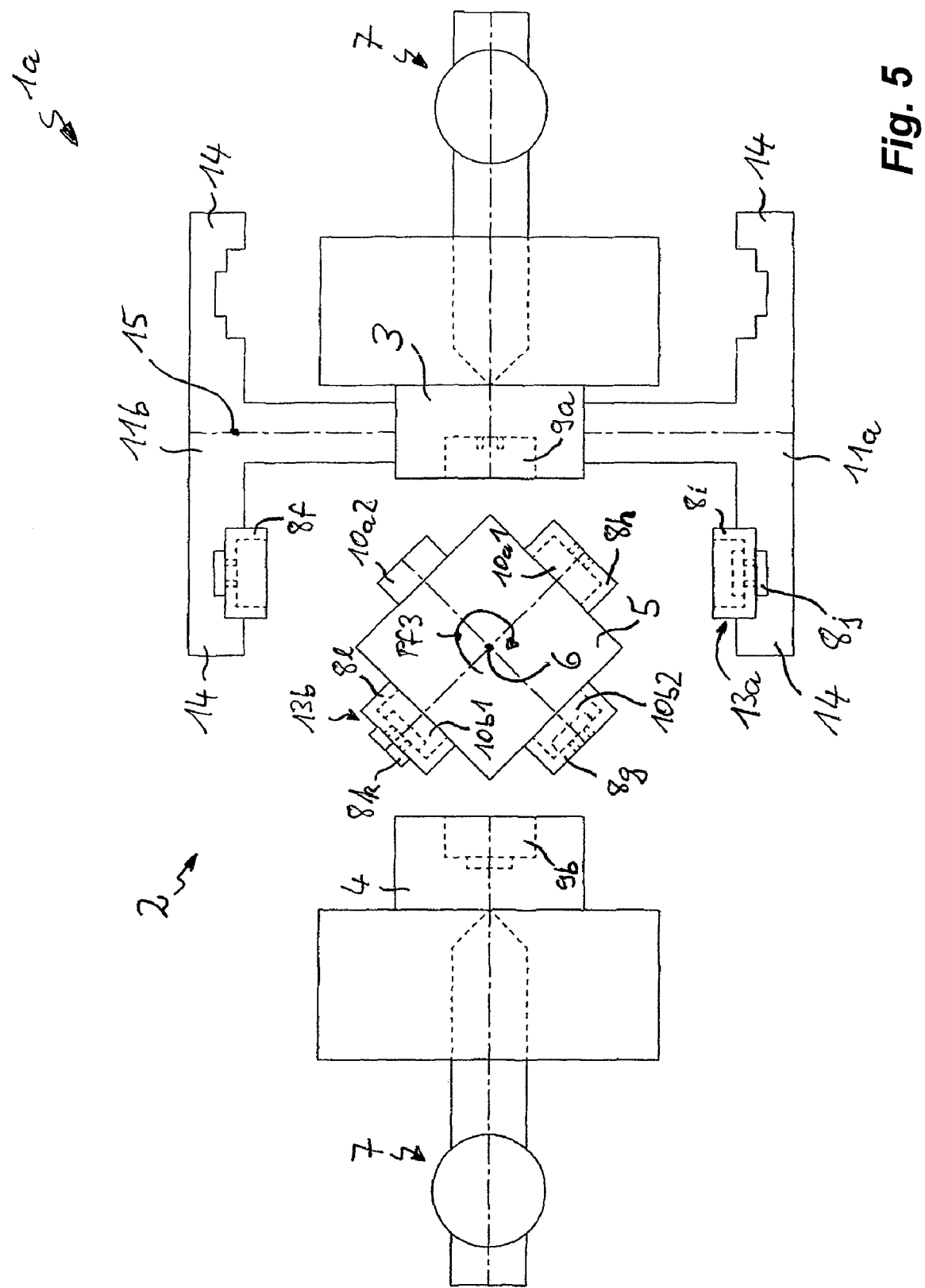
FIG. 5 is a top view of a second exemplary embodiment of an injection molding machine with its molds being open.
Figure 6:
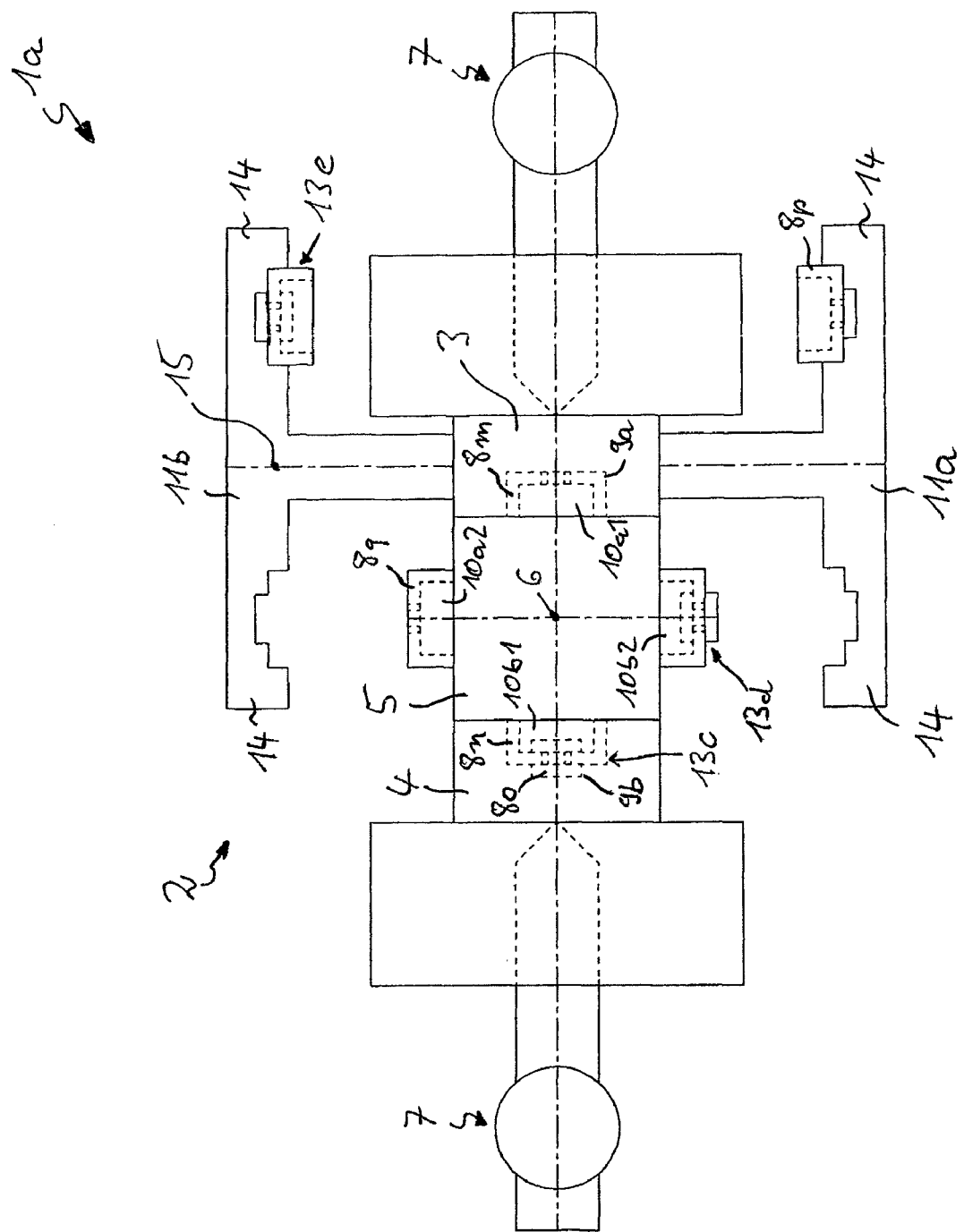
FIG. 6 is a top view of the injection molding machine according to FIG. 5 with closed molds.
Figure 7:
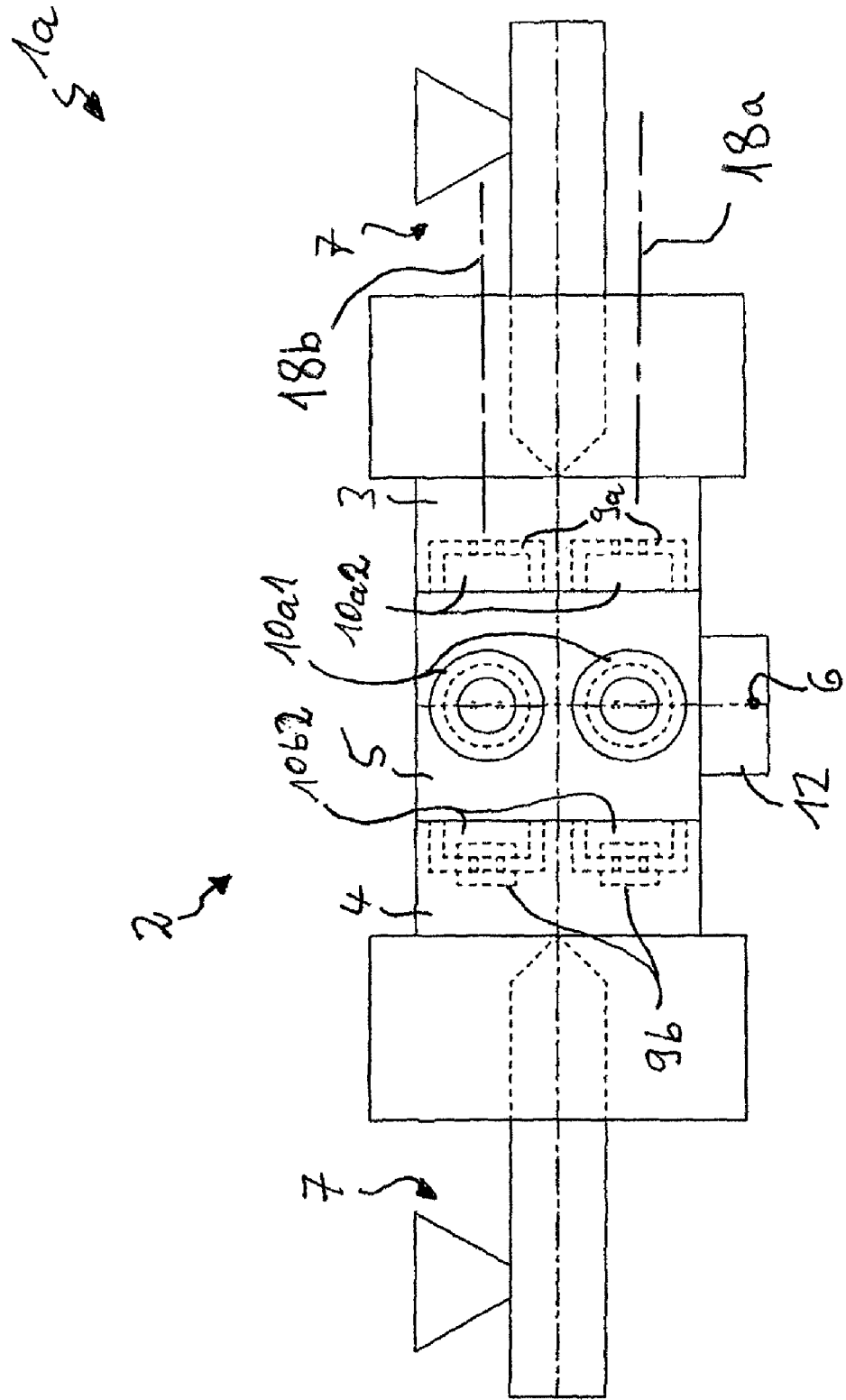
FIG. 7 is a side view of the injection molding machine of FIG. 5.

FIGS. 5 through 7 show another embodiment of an injection molding machine 1*a*. Contrary to the injection molding machine 1 according to FIGS. 1 through 4, in which first and second partial pre-molds are injection molded separately and subsequently interconnected mechanically, in the injection molding machine 1*a* according to FIGS. 5 through 7 the molding areas 9*b*, 10*b*1, 10*b*2 for a second partial pre-mold are embodied to accept a first partial pre-mold, which during the injection molding process of a second partial pre-mold is (partially) enclosed and thus the connection of the first and the second partial pre-mold is directly achieved during the injection molding process.

FIG. 5 shows the injection molding machine 1a in the open position during the rotation of the central block 5 (Pf3). A previously injection molded first partial pre-mold 8*f*, formed in the molding cavity embodied by the molding areas 9*a*, 10*a*2 of the fixed exterior molding part 3 and the central block 5, is held by the gripper 11*b*. Another first partial pre-mold 8*g*, injection molded in a previous processing cycle and removed by the gripper 11*a*, has already been inserted into the molding area 10*b*2 of the central block 5 and is moved in the rotary motion shown in FIG. 5 in the direction towards the mobile exterior molding part 4 and its molding area 9*b* for a second partial pre-mold. Another first partial pre-mold 8*h*, which has been injection molded in the molding areas 9*a*, 10*a*1 in the cycle directly preceding the situation shown, is located in the molding area 10*a*1 of the central block 5 and is moved towards the gripper 11*a*.

The gripper 11*a* holds a finished injection molded part 13*a*, which is formed by a first partial pre-mold 8*i* and a second pre-mold 8*j* injection molded thereat. This finished injection molded part 13*a* can be removed from the gripper 11*a* or ejected. Due to the fact that in the exemplary embodiment shown the grippers 11*a*, 11*b* are each embodied as dual grippers having two gripping arms 14 each, the gripper 11*a* can first be rotated by 180° around the rotary axis 15 such that the finished injection molded part 13*a* can still be further processed in the gripper 11*a*, while the newly fed first partial pre-mold 8*h* can be removed from the free grasping arm 14 of the gripper 11*a*.

After the rotation of the central block 5 into the next processing position and the closing of the injection molding machine 1*a*, in the area of the fixed exterior molding part 3 another first partial pre-mold is injection molded in the molding cavity formed by the molding areas 9*a* and 10*a*2 and another finished molded part is formed in the area of the movable exterior molding part 4 in the molding cavity formed by the molding areas 9*b* and 10*b*2, by a second partial pre-mold being injection molded at the first partial pre-mold 8*g* arranged in the respective molding cavity.

The finished injection molded part 13*b*, previously formed by injection molding the second partial pre-mold 8*k* to the first partial pre-mold 8*l*, is moved in front of the gripper 11*b* and can be removed from its free gripper arm 14 or simply be ejected from the central block 5. Subsequently the first partial pre-mold 8*f*, held at the gripper 11*b*, can be inserted into the cleared molding area 10*b*1 of the central block 5.

FIG. 6 shows the injection molding machine 1*a* in a closed position. In the area of the fixed exterior molding part 3 a first partial pre-mold 8*m* is injection molded in the molding cavity formed by the molding areas 9*a*, 10*a*1, while in the area of the movable exterior molding part 4, at a previously injection-molded first partial pre-mold 8*n*, which is located in the molding cavity formed by the molding areas 9*b*, 10*b*1, a second partial pre-mold 8*o* is injection molded thereat and thus the finished injection molded part 13*c* is formed.

A finished injection molded part 13*d*, formed in the previous processing cycle, can be removed by the gripper 11*a* from the central block 5. A previously injection molded first partial pre-mold 8*p* was already removed from the central block 5 by one of the gripping arms 14 of the gripper 11*a* and can, after the removal of the finished injection molded part 13*d*, be inserted into the molding area 10*b*2 for a second partial pre-mold of the central block 5. In this waiting phase, a first partial pre-mold, held at a gripper 11*a*, 11*b*, can be subjected to another processing, for example be cooled or impinged with ionized air. It is also possible to mount an additional part, particularly in a clamping or adhesive fashion to the partial pre-mold, which then is also at least partially enclosed by injection molding during the molding process.

At the opposite side of the central block 5 the previously injection molded first partial pre-mold 8*q* can be removed with the gripper 11*b*, in order to provide it for inserting it into the molding area 10*b*1 after the opening of the stack mold 2 and the rotation of the central block 5 by 90° in the clockwise direction. A finished injection molded part 13*a*, previously removed from the central block 5 and held at the second gripper arm 14 of the gripper 11*b*, can be ejected, transferred to a further processing device or processed at the gripper 11*b*, for example cooled.

Figure 2:
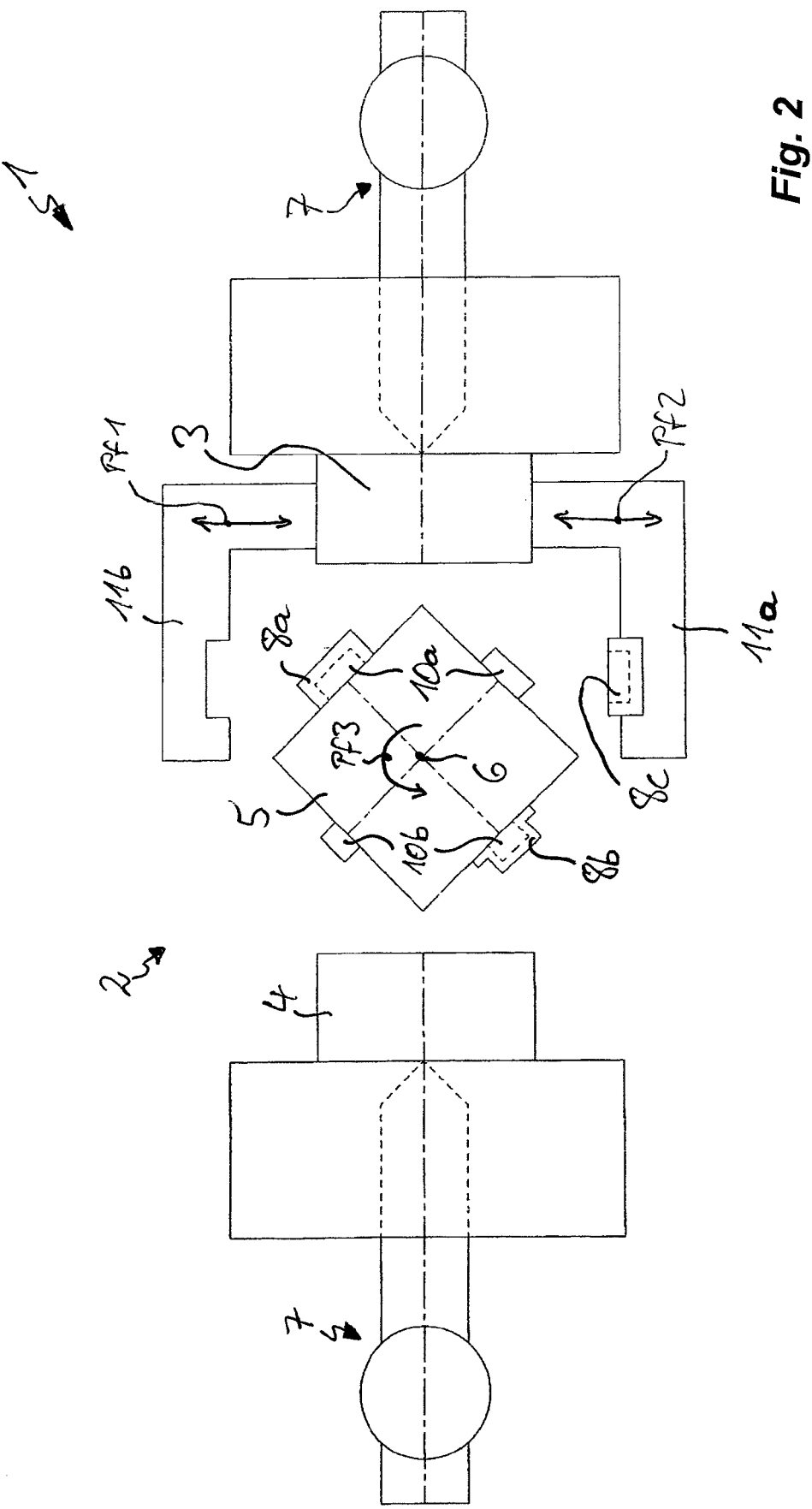
Figure 3:
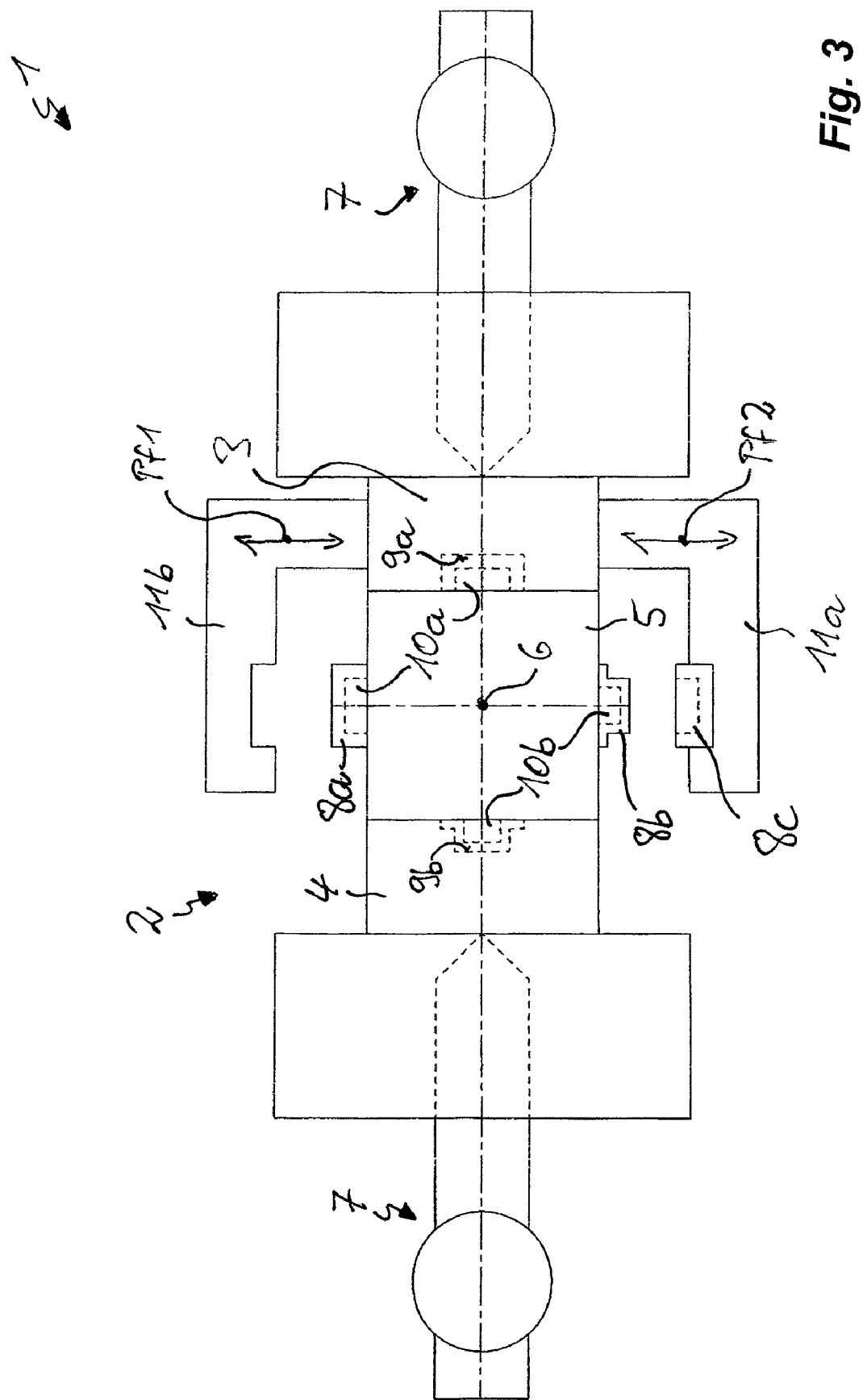

When no additional treatments of the first partial pre-molds and the finished injection molded parts shall be performed, the grippers 11*a*, 11*b* can also be embodied as simple grippers having only one gripping arm as shown in each of the FIGS. 1 through 3, which simplifies the construction of the injection molding machine.

FIG. 7 shows, similar to FIG. 4, a side view of the injection molding machine 1*a* rotated by 90° without showing any grippers. Here, too, it is discernible that several processing levels 18a, 18b are provided, arranged successively in the direction of the rotary axis 6 of the central block 5. This way, within one processing cycle several partial pre-molds can be injection molded, thus increasing the production speed. The additional construction expense is only little, though, particularly only one rotary drive 12 is required for the central block 5; the same applies to the linear drives for the mobile exterior molding part 4.

The invention claimed is:

1. An injection molding machine (1) comprising a stack mold (2) for producing injection molded parts said machine formed of a first partial pre-mold and a second partial pre-mold, a fixed exterior molding part (3), a rotationally or pivotally supported central block (5), and a movable exterior molding part (4), with molding cavities being formed between exterior molding areas (9a, 9b) located at interior sides of the exterior molding parts (3, 4) and interior molding areas (10a, 10b) located at opposite exterior sides of the rotationally or pivotally supported central block (5), said central block (5) includes the interior molding areas (10a) at two of the exterior sides, located adjacent to each other in a rotary or pivotal direction, for forming the first partial pre-molds (8a, 8c, 8e) and the interior molding areas (10b) for forming the second partial pre-molds (8b, 8d) are located at the two other of the exterior sides that are adjacent to each other, and the two exterior molding parts (3, 4) each comprise the exterior molding areas (9a, 9b) for forming a respective one of the first or second partial pre-molds (8a, 8b, 8c, 8d, 8e), the central block (5) is moveable in an oscillating manner in a clockwise and a counterclockwise direction between a first position, in which a first one of the interior molding areas (10a) for forming one of the first partial pre-molds is located adjacent to the exterior molding area (9a) of the fixed exterior molding part while a first one of the interior molding areas (10b) for one of the second partial pre-molds is located adjacent to the exterior molding area (9b) for the movable exterior molding part (4), and a second position, in which a second one of the interior molding areas (10b) for forming the first partial pre-molds is located adjacent to the exterior molding area (9a) of the fixed exterior molding part while a second one of the interior molding areas (10b) for one of the second partial pre-molds is located adjacent to the exterior molding area (9b) for the movable exterior molding part (4), and at least one gripper (11a, 11b) each being provided for removing and holding one of the first partial pre-molds (8a, 8c, 8e) and for positioning a previously removed one of the first partial pre-molds (8a, 8c, 8e) at the second partial pre-mold (8b, 8d) for connection thereto or to remove and hold a molded one of the second partial pre-molds (8f, 8g, 8h, 8i, 8l) and to insert a previously removed one of the first partial pre-molds (8f, 8g, 8h, 8i, 8l) into a molding area (10b1, 10b2) for the second partial pre-molds (8j, 8k) of the central block (5), the at least one gripper is located off-set in the rotary or pivotal direction in reference to the exterior molding parts (3, 4).

2. The injection molding machine according to claim 1, wherein a connection device is provided to connect the two partial pre-molds (8a, 8b, 8c, 8d, 8e) to be interconnected.

3. The injection molding machine according to claim 1, wherein a connection device for inserting adhesives into a connection area is provided between the two partial pre-molds (8a, 8b, 8c, 8d, 8e) to be interconnected.

4. The injection molding machine according to claim 2, wherein the connection device is embodied for welding the two partial pre-molds (8a, 8b, 8c, 8d, 8e) to be interconnected.

5. The injection molding machine according to claim 1, further comprising a feeding device for supplying an additional component provided as a third partial element, that can be connected or held at the partial pre-mold (8a, 8b, 8c, 8d, 8e) to interconnect the two partial pre-molds (8a, 8b, 8c, 8d, 8e).

6. The injection molding machine according to claim 1, wherein several of the molding areas (10a, 10b, 10a1, 10a2, 10b1, 10b2) are provided at each of the exterior areas of the central block (5), arranged side-by-side in a perpendicular direction in reference to the rotary axis (6) of the central block (5) for one of the two partial pre-molds (8a-8q) as well as corresponding ones of the molding areas (9a, 9b) are provided side-by-side at the two exterior molding parts (3, 4).

7. The injection molding machine according to claim 1, wherein additional exterior molding areas and interior molding areas are arranged successively on the fixed exterior molding part (3), the central block (5), and the movable exterior molding part (4) in a direction of the rotary axis (6) of the central block (5).

* * * * *